United States Patent
Green et al.

(10) Patent No.: US 10,083,423 B2
(45) Date of Patent: Sep. 25, 2018

(54) REAL TIME ELECTRONIC MAIL

(75) Inventors: Greg Green, Colorado Springs, CO (US); Kevin S. Dibble, Colorado Springs, CO (US); Conor McCluskey, Colorado Springs, CO (US)

(73) Assignee: BombBomb, LLC, Colorado Springs, CO (US)

(*) Notice: Subject to any disclaimer, the term of this patent is extended or adjusted under 35 U.S.C. 154(b) by 771 days.

(21) Appl. No.: 13/161,193

(22) Filed: Jun. 15, 2011

(65) Prior Publication Data

US 2012/0011196 A1 Jan. 12, 2012

Related U.S. Application Data

(60) Provisional application No. 61/363,047, filed on Jul. 9, 2010.

(51) Int. Cl.
*G06Q 10/10* (2012.01)

(52) U.S. Cl.
CPC .................. *G06Q 10/107* (2013.01)

(58) Field of Classification Search
None
See application file for complete search history.

(56) References Cited

U.S. PATENT DOCUMENTS

| | | | |
|---|---|---|---|
| 5,848,397 A * | 12/1998 | Marsh et al. | 705/14.61 |
| 6,678,663 B1 * | 1/2004 | Mayo | 705/14.73 |
| 6,707,472 B1 * | 3/2004 | Grauman | G06Q 10/107 709/206 |
| 6,965,926 B1 * | 11/2005 | Shapiro | G06F 17/30876 709/206 |
| 6,993,559 B2 * | 1/2006 | Jilk, Jr. | G06F 17/3089 709/206 |

(Continued)

FOREIGN PATENT DOCUMENTS

| | | |
|---|---|---|
| WO | WO 9957660 A1 * | 11/1999 |
| WO | WO 2008141344 A2 * | 11/2008 |

OTHER PUBLICATIONS

Email Marketing 8 seconds (Apr. 2011) "8Seconds optimizes your email marketing based on your customer's behavior. All in real time." Web Site: http://www.8seconds.net/ ; Accessed on: Apr. 19, 2011; 11 pages.

(Continued)

*Primary Examiner* — Jeffrey R Swearingen
(74) *Attorney, Agent, or Firm* — Swanson & Bratschun, L.L.C.

(57) ABSTRACT

Novel tools and techniques for generating and/or transmitting dynamic electronic mail messages, which can include content that is generated at the time the email message is opened. In some cases, an email message will include a reference to a resource on a server, and a standard email client can request that resource with the reference, either automatically or upon prompting by the user. Based on the nature of the request, a number of properties or characteristics of the request (and/or of the circumstances under which the email message is opened or loaded for display) can be derived or identified. Further, demographic information about the recipient can be identified. Based on these characteristics and/or demographic information, customized content can be generated and transmitted for display, e.g., in body of the electronic message.

27 Claims, 6 Drawing Sheets

(56) References Cited

U.S. PATENT DOCUMENTS

| | | | |
|---|---|---|---|
| 7,249,165 B1* | 7/2007 | Lu et al. | 709/217 |
| 7,769,764 B2* | 8/2010 | Ramer et al. | 705/14.4 |
| 7,779,370 B2* | 8/2010 | Mavinkurve et al. | 715/864 |
| 8,381,972 B2* | 2/2013 | Beemer et al. | 235/380 |
| 2004/0073482 A1* | 4/2004 | Wiggins | G06Q 30/02 705/14.5 |
| 2006/0015559 A1* | 1/2006 | Yabe | H04L 12/58 709/206 |
| 2007/0112800 A1* | 5/2007 | Seidl et al. | 707/100 |
| 2010/0036922 A1* | 2/2010 | Stafford et al. | 709/206 |
| 2011/0258049 A1* | 10/2011 | Ramer et al. | 705/14.66 |

OTHER PUBLICATIONS

Infor (2010), "Infor CRM Epiphany E-mail Advisor" Flyer, 2 pages.
LiveIntent (Apr. 2011) Web Site: http://www.liveintent.com/index.php; Accessed on Apr. 19, 2011; 43 pages.
Movable Ink (Apr. 2011) Web Site: http://www.movableink.com. Accessed on Apr. 19, 2011; 6 pages.
Sympact Technologies (Feb. 2010), "Tailored Ads to the Individual," Web Site: http://www.svmpact.net/; Accessed on Jun. 17, 2010; 4 pages.

\* cited by examiner

REAL TIME ELECTRONIC MAIL

CROSS-REFERENCE TO RELATED APPLICATIONS

This application claims the benefit, under 35 U.S.C. § 119(e), of provisional U.S. Patent Application No. 61/363,047, filed Jul. 9, 2010 by Green et al. and entitled, "Real Time Electronic Mail," the entire disclosure of which is incorporated herein by reference for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to the generation and/or transmission of electronic mail messages, and more particularly, to tools and techniques for generating and/or sending electronic mail messages with dynamic content.

BACKGROUND

Customized electronic mail ("email") content is not a new idea. Many email marketing systems use this model. However, they all work generally under the same principal. The content of an email is determined at send time through the use of tokenization. A very common example is to place the recipients name in the body of the email just before sending it. There are more complex versions of this, but they all have one thing in common. They all set the email content at the time the email is sent, and the content of the message cannot change after it has been sent.

The ability to place truly dynamic, real-time content in an email (that is, content that is updated at the time the email is opened) has long been a goal of email senders, but it has always presented severe challenges to anyone trying to achieve it. The possible techniques available to achieve the goal, like those used on web pages, such as JavaScript, iFrames, and SWF Objects, are specifically blocked by almost all email clients.

Accordingly, there is a need for tools and techniques that provide the ability to generate and transmit email messages that contain content that is fresh (and/or can be refreshed) when the message is read by the recipient, not just when the message has been sent.

SUMMARY

Certain embodiments provide tools and techniques for generating and/or transmitting dynamic email messages. In an aspect of some embodiments, a dynamic email message can include content that is generated at the time the email message is opened. This functionality can provide several advantages; for example, messages can be customized to account for the user's current location when the message is opened, and/or messages can be customized to contain information that is current at the time the message is opened. These features can provide higher satisfaction in the user experience, allowing for example, news messages that do not become stale if the user does not open the message for several hours or days, or promotional messages that relate to businesses near the user's current location. In some cases, certain embodiments even allow for the same message to contain different content every time it is opened (and/or, if desired, when the delay between opening the message the first time and opening the message a second time is sufficiently long to make new content appropriate).

In an aspect of some embodiments, an email message will include a reference to a resource on a server, and a standard email client can request that resource with the reference, either automatically or upon prompting by the user. Based on the nature of the request, a number of properties or characteristics of the request (and/or of the circumstances under which the email message is opened or loaded for display) can be derived or identified. Depending on the embodiment, such characteristics can include, without limitation, the time and/or physical location at which the message is being viewed, the type of device on which the message is being viewed, and/or the like. From these characteristics, an intelligent decision can be made about the nature of the content to provide in response to the request. This content can then be displayed in the body of the email message, allowing for truly dynamic email content that is most useful to the recipient, under the circumstances in which the recipient views the message.

Various embodiments can provide, without limitation, methods, systems, software products, and/or the like. Merely by way of example, a method might comprise one or more procedures, including without limitation procedures that can be executed by, on, or with a computer system. Conversely, an embodiment might provide a computer system configured with instructions to perform some or all of a method. Similarly, software, hardware, or firmware code, such as a computer program, applet, script, or the like, can comprise a set of instructions that are executable by a computer system (and/or a processor therein) to perform such methods (and/or portions thereof). In many cases, such software programs are stored in and/or encoded on physical, tangible and/or non-transitory computer readable media (such as, to name but a few examples, optical media, magnetic media, and/or the like).

Merely by way of example one set of embodiments provides methods. An exemplary method of providing a dynamic electronic mail message might comprise transmitting an electronic message from a mail server computer system. In some aspects, the electronic message can comprise a reference, such as an HTML IMG tag comprising a first URL that references a first resource at a resource server computer system. The method might also comprise an HTML anchor tag comprising a second URL.

In some cases, the method further comprises receiving the electronic message at a recipient computer system and/or opening the electronic message (or otherwise loading the electronic message for display) at the recipient computer system (which can include transmitting a request for a first resource referenced by the first URL). The method might further comprise receiving, at the resource server computer system, the request for the first resource referenced by the first URL. In response to receiving the request, the method might comprise executing a first executable script at the resource server computer system, based on the request for the first resource.

In several embodiments, executing the first executable script might comprise recording an indication that the recipient opened the electronic message, and/or identifying a set of characteristics about the circumstances under which the electronic message was loaded for display. Although such characteristics can vary by embodiment, they can include, without limitation, some or all of the following properties or characteristics: an identification of the electronic message, based at least in part on the request for the first resource; a recipient of the electronic message, based at least in part on the request for the first resource; an IP address of the recipient computer system that loaded the electronic message for display, based at least in part on the request for the first resource; a device type of the recipient computer system that loaded the electronic message for display, based at least in part on the request for the first resource; a physical location (e.g., an address, a set of GPS coordinates, etc.) of the recipient computer system that loaded the electronic message for display, perhaps based at least in part on the IP address of the recipient computer system; and/or a timestamp indicating a time at which the electronic message was loaded for display.

Executing the first executable script might further comprise identifying a set of demographic information about the recipient, based at least in part on one or more characteristics about the circumstances under which the message was loaded for display. Depending on the embodiment, the set of demographic information might include one or more of the following values: an address of the recipient; an age of the recipient; an education level of the recipient; a gender of the recipient; a marital status of the recipient; a set of one or more interests of the recipient; an income level of the recipient; and/or past online behavior of the recipient;

The execution of the first executable script might further include obtaining a first set of content to be provided in response to the first request, based at least in part on one or more characteristics about the circumstances under which the electronic message was loaded for display and at least a portion of the set of demographic information about the recipient. In some cases, executing the script includes generating a set of one or more images comprising the first set of content to be provided in response to the first request, identifying a third URL associated with the first set of content, and/or correlating the third URL with the second URL. In some cases, executing the script might further comprise transmitting the set of one or more images as the first resource, for reception by the recipient computer system, in response to the first request.

The set of one or more images can be received at the recipient computer system and/or displayed, at the recipient computer system, within the body of the electronic message. The method can further comprise receiving, at the recipient computer system, a selection by a user of the second URL, and/or transmitting, from the recipient computer system, a request for a second resource referenced by the second URL. This request for the second resource can be received at a web server computer system, and the method can further include executing a second executable script at the web server computer system, based on the request for the second resource.

Executing the second executable script might further comprise recording an indication that the recipient selected the second URL, and/or redirecting the request for the second set of content to a third set of content referenced by the third URL. The method, then, might comprise displaying the third set of content in a web browser at the recipient computer system.

Another method of providing a dynamic electronic mail message, could comprise transmitting an electronic message. In an aspect of some embodiments, the message might include a markup language tag comprising a first URL; the markup language tag might be configured to request a first resource when the electronic message is displayed at a recipient computer system. The method, then, might further comprise receiving, at a server computer system, a request from the recipient computer system for the first resource referenced by the first URL. In some cases, the method includes identifying, at the server computer system, a set of characteristics about the circumstances under which the electronic message was displayed at the recipient computer system.

The method can further comprise generating, at the server computer system, a set of content to be provided in response to the first request, based at least in part on one or more of the characteristics about the circumstances under which the electronic message was displayed at the recipient computer system. Additionally and/or alternatively, the method might include transmitting, from the server computer system, the set of content to be displayed within the body of the electronic message at the recipient computer system.

In accordance with another set of embodiments, a method of providing content for an electronic mail message, which might include a markup language tag comprising a first URL, might comprise receiving, at a server computer system, a request from a recipient computer system for a first resource referenced by the first URL. The method might further comprise identifying, at the server computer system, a set of characteristics about the circumstances under which the electronic mail message was displayed at the recipient computer system. In some cases, the method might comprise generating, at the server computer system, a set of content to be provided in response to the first request, based at least in part on one or more of the characteristics about the circumstances under which the electronic message was displayed at the recipient computer system. In certain embodiments, this set of content can be transmitted, from the server computer system, to be displayed within the body of the electronic message at the recipient computer system.

Another set of embodiments provides systems, including without limitation computer systems. An exemplary computer system might comprise a mail server. In an aspect, the mail server might comprise a first processor and a first computer readable medium having encoded thereon a first set of instructions executable by the first processor to cause the mail server to perform one or more operations. In another aspect, the first set of instructions might comprise instructions for transmitting an electronic message, which can include an IMG tag comprising a first URL that references a first resource at a resource server computer system and/or an HTML anchor ("A") tag comprising a second URL.

In some embodiments, the computer system might include a recipient computer system comprising a second processor and a second computer readable medium having encoded thereon a second set of instructions executable by the second processor to cause the recipient computer to perform one or more operations. The second set of instructions might comprise instructions for receiving the electronic message, and/or instructions for loading the electronic message for display. In an aspect, loading the electronic message for display might comprise transmitting a request for a first resource referenced by the first URL.

Certain embodiments include a resource server (which might be incorporated with the mail server). The resource server might include a third processor and a third computer readable medium having encoded thereon a third set of instructions executable by the third processor to cause the resource server to perform one or more operations. The set of instructions might include instructions for receiving, at the resource server computer system, the request for the first resource referenced by the first URL, and/or instructions for executing a first executable script at the resource server computer system.

The first executable script might comprise instructions for recording an indication that the recipient opened the electronic message and/or instructions for identifying a set of characteristics about the circumstances under which the electric message was loaded for display. Such characteristics can include, without limitation, some or all of the characteristics described above. The first executable script might further comprise instructions for identifying a set of demographic information about the recipient, based at least in part on one or more characteristics about the circumstances under which the electronic message was loaded for display, such as the demographic information described above, to name a few examples.

The first executable script might further comprise instructions for obtaining a first set of content to be provided in response to the first request, based at least in part on one or more characteristics about the circumstances under which the electronic message was loaded for display and at least a portion of the set of demographic information about the recipient; instructions for generating a set of one or more images comprising the first set of content to be provided in response to the first request; instructions for identifying a third URL associated with the first set of content; and/or instructions for correlating the third URL with the second URL. The first executable script might further comprise instructions for transmitting the set of one or more images as the first resource, for reception by the recipient computer system, in response to the first request. The second set of instructions (at the recipient computer system) might further comprise instructions for receiving a selection by the user of the second URL, and/or instructions for transmitting a request for a second resource referenced by the second URL.

In some embodiments, the system further comprises a web server (which might be integrated with the mail server and/or the resource server). In one aspect, the web server might comprise a fourth processor and/or a fourth computer readable medium having encoded thereon a fourth set of instructions executable by the fourth processor to cause the web server to perform one or more operations. Merely by way of example, the fourth set of instructions might comprise instructions for receiving the request for the second resource referenced by the second URL, and/or instructions for executing a second executable script, based on the request for the second resource.

The second executable script can comprise, in certain embodiments, instructions for recording an indication that the recipient selected the second URL, and/or instructions for redirecting the request for the second set of content to a third set of content referenced by the third URL. Thus, the second set of instructions (at the recipient computer system, might include instructions for displaying the third set of content in a web browser.

A computer system in accordance with another set of embodiments might comprise one or more processors. The computer system might further comprise a mail server and/or a resource server, which can be implemented as separate machines, separate processes on the same machine, and/or the like. In an embodiment, the computer system further comprises a first set of instructions executable by at least one of the one or more processors to cause the mail server to perform one or more operations, and/or a second set of instructions executable by at least one of the one or more processors to cause the resource server to perform one or more operations.

In an aspect of some embodiments, the first set of instructions comprises instructions for transmitting an electronic message. In various embodiments, the message might comprise a markup language tag comprising a first URL. The markup language tag might be configured to request a first resource when the electronic message is displayed at a recipient computer system.

In another aspect of some embodiments, the second set of instructions might comprise instructions for identifying, upon receipt of a request from the recipient computer system for the first resource referenced by the first URL, a set of characteristics about the circumstances under which the electronic message was displayed at the recipient computer system. The second set of instructions might further comprise instructions for generating a set of content to be provided in response to the first request, based at least in part on one or more of the characteristics about the circumstances under which the electronic message was displayed at the recipient computer system. In some cases, the second set of instructions also includes instructions for transmitting, from the server computer system, the set of content to be displayed within the body of the electronic message at the recipient computer system.

Another set of embodiments includes computer systems for providing content for an electronic mail message that includes markup language tag comprising a URL. One such computer system comprises a processor and a computer readable medium in communication with the processor. In an aspect of some embodiments, the computer readable medium has encoded thereon a set of instructions executable by the processor to cause the computer system to perform one or more operations. The set of instructions can include instructions for identifying, upon receipt of a request from a recipient computer system for a first resource referenced by the first URL, a set of characteristics about the circumstances under which the electronic mail message was displayed at the recipient computer system. The set of instructions might further comprise instructions for generating a set of content to be provided in response to the first request, based at least in part on one or more of the characteristics about the circumstances under which the electronic mail message was displayed at the recipient computer system. In some cases, the set of instructions further comprises instructions for transmitting the set of content to be displayed within the body of the electronic message at the recipient computer system.

Another set of embodiments provides apparatus. An exemplary apparatus might comprise one or more computer readable media collectively having stored thereon one or more sets of instructions executable by one or more computers to perform one or more operations. The sets of instructions collectively might include instructions similar to those described above.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
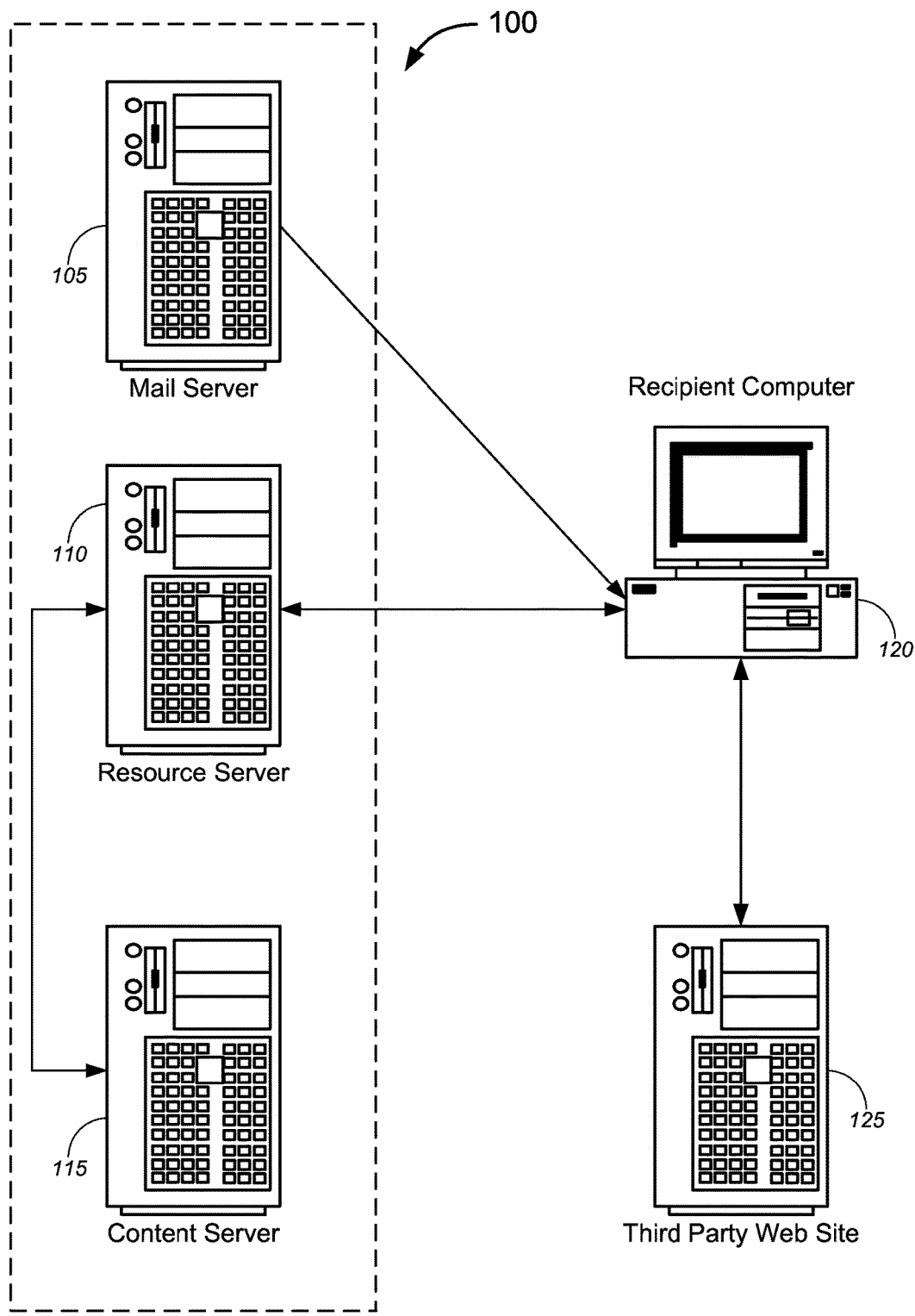
FIG. 1 is a block diagram illustrating a system for providing a dynamic email message, in accordance with various embodiments.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including", as well as other forms, such as "includes" and "included", should be considered non-exclusive. Also, terms such as "element" or "component" encompass both elements and components comprising one unit and elements and components that comprise more than one unit, unless specifically stated otherwise.

Certain embodiments provide tools and techniques for generating and/or transmitting dynamic email messages. The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

In an aspect of some embodiments, a dynamic email message can include content that is generated at the time the email message is opened. This functionality can provide several advantages; for example, messages can be customized to account for the user's current location when the message is opened, and/or messages can be customized to contain information that is current at the time the message is opened. These features can provide higher satisfaction in the user experience, allowing for example, news messages that do not become stale if the user does not open the message for several hours or days, or promotional messages that relate to businesses near the user's current location. In some cases, certain embodiments even allow for the same message to contain different content every time it is opened (and/or, if desired, when the delay between opening the message the first time and opening the message a second time is sufficiently long to make new content appropriate).

In an aspect of some embodiments, this functionality can be provided without the need for customized email clients or browsers. Merely by way of example, most modern email clients support HTML messages, which can contain, in addition to formatting, hyperlinks and other features common to web pages. Generally, however, these clients do not support dynamic content, such as JavaScript, video, and/or the like. Using particular embodiments, an email sender can utilize the standard capabilities of such email clients to provide dynamic content without the need for JavaScript and the like. In an aspect of some embodiments, this functionality can be accomplished through the use of HTML tags in the message that attempts to load an image in the body of the message. Merely by way of example, in one embodiment, when a server receives an HTTP GET request from the email client attempting to load the image, the server can obtain content that is current at the time the request is received, generate a set of one or more images from that content, and provide those images in response to the request.

Certain embodiments that employ this technique can provide additional functionality as well. Merely by way of example, information about the request, such as the nature of the device making the request, the date and/or time of the request, the physical location of the request (which can often be obtained from the IP address from which the request originates), and the like, can be used to select and/or customize the content that is returned. Likewise, demographic information about the recipient, which can be retrieved from a database based on the identity of the recipient (which, in turn, can be obtained in a variety of ways, for example, from data in the URL provided in the email message), can be used to customize and/or select content that is appropriate for the recipient. Such demographic information can include, without limitation, the recipient's address, age, education level, gender, marital status, interests, income level, browsing habits and/or other past online behavior, and/or the like.

For example, several of the techniques described herein can be implemented using the system 100 illustrated by FIG. 1. It should be noted, however, that this system 100 can operate differently in other embodiments (including without limitation those described herein), and the techniques described herein can be implemented, in accordance with various embodiments, using a hardware architecture different from that depicted by FIG. 1.

The system 100 of FIG. 1 comprises a mail server 105, a resource server 110, and a content server 115. It should be noted that the components of the system 100 are illustrated functionally by FIG. 1, and that a variety of hardware configurations are possible in accordance with various embodiments. Merely by way of example, in some cases, the mail server 105 might be implemented as a process on a first computer system, while the resource server 110 is implemented as a process on a second computer system, and the content server 115 is implemented as a process on a third computer system. In other embodiments, two or more of the servers 105-115 may be implemented as processes running on the same computer system. Exemplary computer systems that can serve as mail servers, resource servers, and/or content servers are described below with respect to FIGS. 5 and 6.

The mail server 105 can comprise any program or process that is capable of generating and/or transmitting email messages. In particular embodiments, the mail server 105 provides the capability to generate and/or transmit bulk email messages to separate recipients. Each message might comprise one or more URLs, as described in further detail below. A variety of commercially available mail servers can be used (perhaps after modification as appropriate) in accordance with various embodiments.

In some embodiments, the resource server 110 comprises a program or process that is capable of providing resources referenced by URLs that are provided in the email messages. In aspect, this functionality can be provided through responding to HTTP GET requests. As such, resource server 110 may be configured similarly to a standard Web server. In particular embodiments, the resource server is configured with the capability to execute scripts, such as those written in Perl, PHP, Java, and/or the like. In other aspects, the resource server 110 may have access to the a data store (such as a database, file system, etc.) that stores demographic information about email recipients, and/or a data store that stores information about resource requests and/or responses thereto. This data store might, for example, store a history of requests and/or might cache content (e.g., images, video, text, etc.) that has been provided in response to these requests.

The content server 115, in some embodiments, is configured to provide content to the resource server 110 for responding to requests from email clients (and/or other requesters). In a particular embodiment, for example, the content server 115 might be configured to generate content definitions, which can be used by the resource server 110 to generate images comprising appropriate content. In one aspect, such a content definition might be provided as an XML file and/or data stream that can be parsed by the resource server 110 to determine the composition of an image or other content to be provided in response to a request.

Detailed examples describing various modes of operation of the system 100 are described below. In general, however, the mail server generates an email message and/or transmits the email message for reception by a recipient computer 120. The recipient computer 120 can be any device capable of receiving email messages, including without limitation desktops, laptops, or other personal computers; personal digital assistants, email appliances, wireless phones, including without limitation smart phones, tablet computers, and/or the like. In an aspect, the recipient computer 120 comprises an email client, which can be any of a variety of commercially available standalone email client applications, web browser-based email clients (including without limitation web-based interfaces to a mail server, which generally is a different mail server than the mail server 105 but could, in some instances be the same), and/or the like.

The email message might comprise one or more URLs that reference resources on the resource server 110. Merely by way of example, the email message might comprise HTML text containing a URL encapsulated within an HTML image ("<IMG>") tag. As another example, the email message might further comprise an HTML anchor ("<A>") tag containing a link to the resource server 110 (and/or another server). This anchor tag might be associated with the image tag, such that when a user clicks on the image, the user selects the anchor tag.

In one set of embodiments, when an email client at the recipient computer 120 loads the message for display (e.g. opens the email message, previews the email message, etc.), the email client may be configured to request the resource specified by the URL in the image tag, either automatically or based upon user authorization. This resource request will be received by the resource server 110, which might generate content (as described in further detail below, for example) and provide that content to the recipient computer 120 as a response to the recipient computer's 120 request. This content, for example, might be an image (which could contain text blocks, such that the image appears to be text, at least in part), video, HTML code (including without limitation HTML5 code), and/or any other appropriate content. In some cases, the content can be configured to be displayed in the subject field of the email message, such that the email message can have a dynamic subject line. (This can be accomplished, for example, if the email client supports images in the subject field.)

If the user at the recipient computer 120 clicks on the content, thereby selecting the URL in the anchor tag, the email client will transmit another resource request to the resource server 110 (or other computer). Upon receiving this resource request, the resource server 110 (or other computer), in certain embodiments, can redirect the request to another URL, perhaps at a third party website 125, that is associated with the content previously provided to the recipient computer 120 by the resource server 110. The content provided by this URL to the recipient computer 120 then can be displayed for the user, perhaps in a web browser or other application (and/or in the email client itself).

Figure 2:
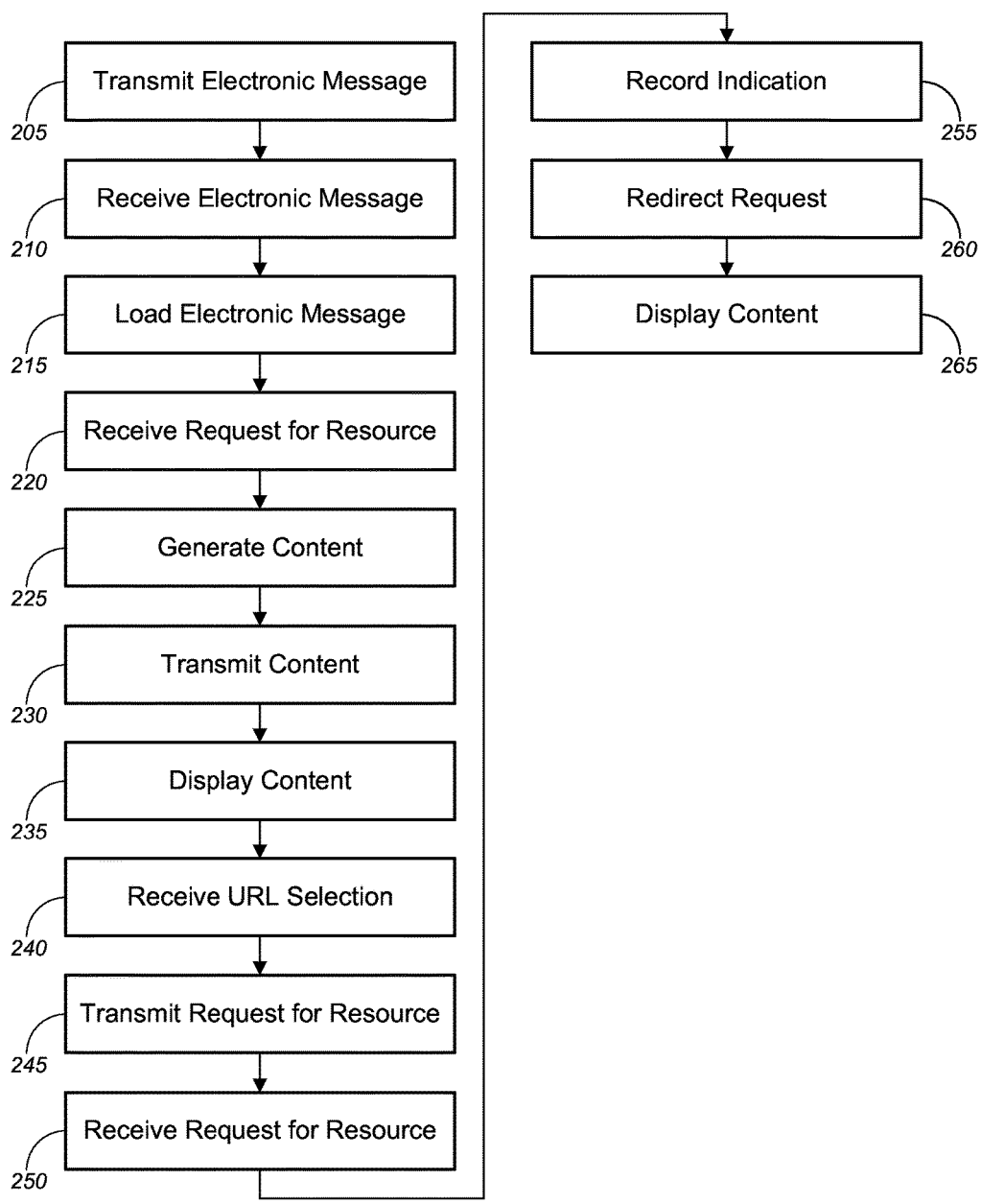
FIG. 2 is a process flow diagram illustrating a method of providing dynamic email, in accordance with various embodiments.
Figure 3:
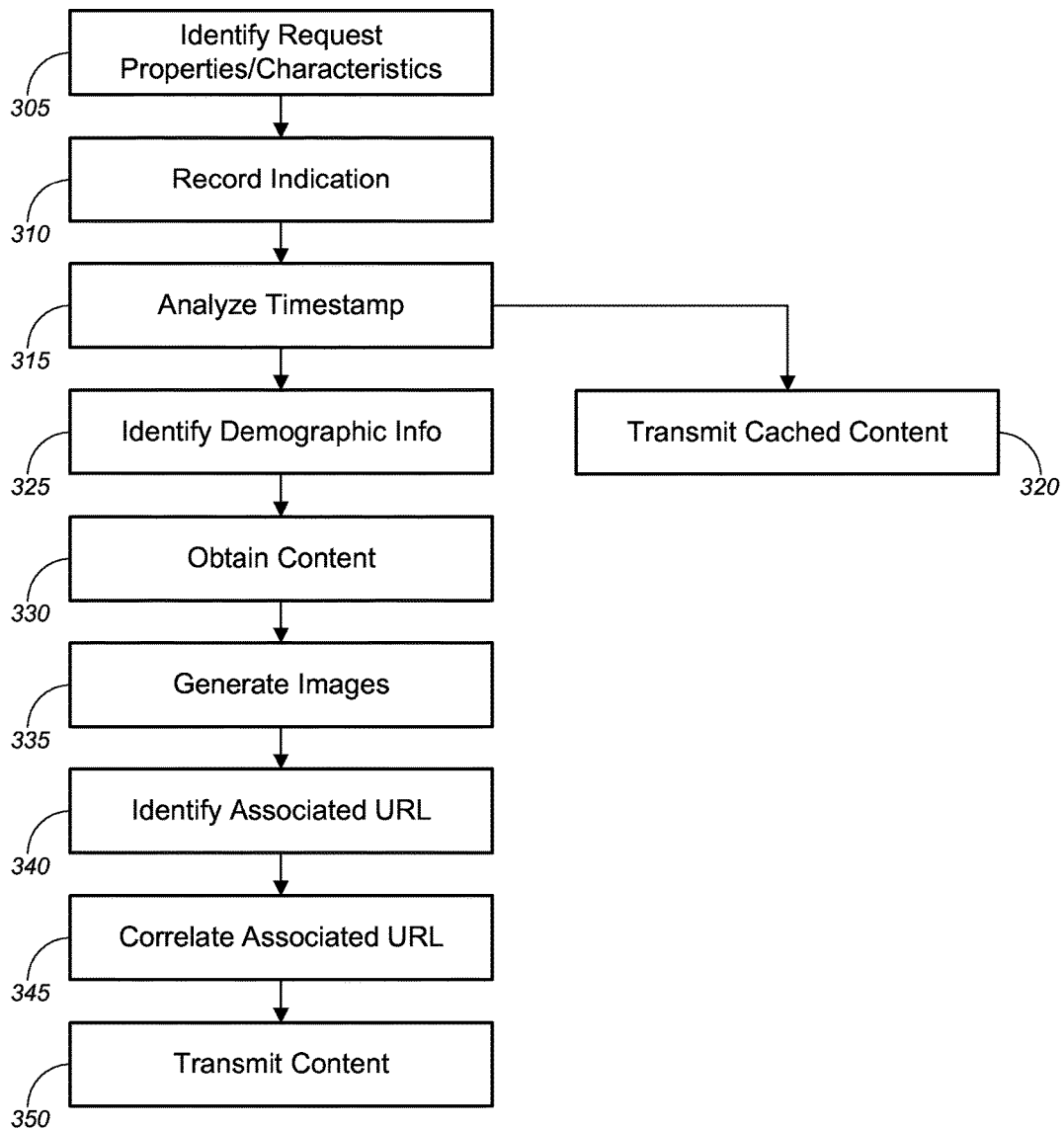
FIG. 3 is a process flow diagram illustrating a method of generating dynamic content for an email message, in accordance with various embodiments.
Figure 4:
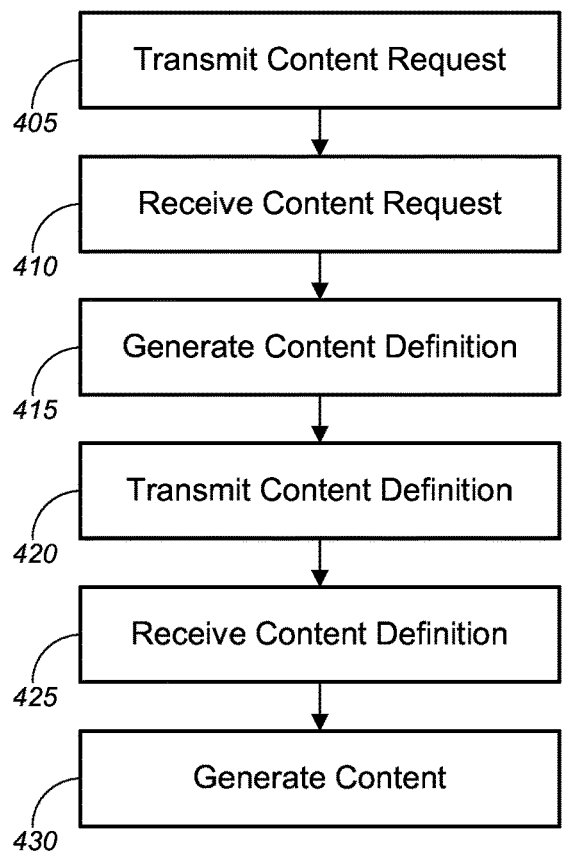
FIG. 4 is a process flow diagram illustrating a method obtaining dynamic content from a content server, in accordance with various embodiments.

FIGS. 2-4 illustrate various methods that can be used to generate and/or transmit dynamic email messages. While the methods of FIGS. 2-4 are illustrated, for ease of description, as different methods, it should be appreciated that the various techniques and procedures of these methods can be combined in any suitable fashion, and that, in some embodiments, the methods depicted by FIGS. 2-4 can be considered interoperable and/or as portions of a single method. Similarly, while the techniques and procedures are depicted and/or described in a certain order for purposes of illustration, it should be appreciated that certain procedures may be reordered and/or omitted within the scope of various embodiments. Moreover, while the methods illustrated by FIGS. 2-4 can be implemented by (and, in some cases, are described below with respect to) the system 100 of FIG. 1 (or components thereof), these methods may also be implemented using any suitable hardware implementation. Similarly, while the system 100 of FIG. 1 (and/or components thereof) can operate according to the methods illustrated by FIGS. 2-4 (e.g., by executing instructions embodied on a computer readable medium), the system 100 can also operate according to other modes of operation and/or perform other suitable procedures.

FIG. 2 illustrates a method for providing dynamic content in an email message. (As used herein, "dynamic content" means content that is determined, generated, and/or provided to the email client at the time the email message is opened.) The method 200 comprises transmitting an electronic message for reception by a client computer (block 205). In one aspect, the electronic message might comprise an HTML image tag comprising a first URL that references a first resource (e.g., set of content) at a resource server. In another aspect, the electronic message might comprise an HTML anchor tag comprising a second URL that can be used, in some cases, to access a web page associated with content provided by the first URL. Thus, the anchor tag might be associated with the image tag, such that when a user clicks on the image tag, the user effectively selects the second URL in the anchor tag. Alternatively and/or additionally, the second URL can be provided in the email message but separate from the image tag.

At block 210, the electronic message is received at a recipient computer, and at block 215, the recipient computer loads the electronic message for display (e.g., by a user opening the message in an email client, the email client previewing the message, etc.). In an aspect, when the recipient computer loads the message for display, the recipient computer also transmits a request (e.g., an HTTP GET request) for the first resource referenced by the URL in the image tag. This process may be performed automatically by the email client, or upon user instructions, depending on the configuration of the email client.

In some embodiments, the method 200 comprises receiving (e.g. at a resource server) a request for the first resource (block 220), that is the resource referenced by the URL associated with the image tag in the email message. Upon receiving the requests for the first resource, the resource server generates content to respond to the request (block 225). In an aspect of some embodiments, this content is generated only upon receiving the resource request. In this way, such embodiments can ensure that the content is current at the time the recipient (i.e., the user of the recipient computer and/or the person to which the email message was addressed) opened the email message, and can customize the content for the recipient. This content can then be transmitted for reception by the recipient computer (block 230), as a response to the request for the resource referenced by the URL in the image tag in the email message. As noted above, this content can comprise one or more images (which themselves can contain graphical images, text box, and/or the like) plaintext, HTML formatted text, video, and any other audio and/or visual content that can be displayed and/or reproduced at the recipient computer, including without limitation in the body of the email message).

In a particular set of embodiments, the resource server can perform several operations in order to generate this content. In particular, the resource server may be configured to execute executable script (such as a PHP script, a Perl script, a Java application or applet, and/or the like) in response to the resource request. To promote this behavior, the URL in the email message (and/or the corresponding HTTP GET request) might reference the name of the executable script at the resource server. Additionally in or alternatively the URL (and/or the corresponding HTTP GET request) may contain information that identifies the email message itself and/or the recipient of the email message, to enable the resource server to identify and/or classify the email message and/or the recipient.

FIG. 3 illustrates a method 300 that can be performed by the resource server, upon receiving the resource request, to generate and/or transmit the appropriate content. The method 300 can be implemented as an executable script, as mentioned above, that is executed by the resource server upon receiving the resource request.

In some embodiments, the method 300 comprises identifying a set of properties or characteristics of the resource request (block 305). In a particular embodiment, such properties can include one or more characteristics about the circumstances under which an electronic message (that included the URL that resulted in the request) was opened at the recipient computer or otherwise loaded for display at the recipient computer. Such properties can include any information within the request itself and/or any information that can be derived from the request.

In one aspect, for example, the resource server might include a database for storing information about transmitted email messages and responses thereto. (Such a record might be created by the mail server upon sending the email message, for example.) Accordingly, if a record for a particular email message includes an identifier of the email message, and the resource request includes an identifier, the request can be correlated with the email message (other techniques for correlating resource requests with email messages are possible as well), and properties of the request can include both properties that are inherent to the request itself and properties, such as an identification of the email message and/or the recipient, which are correlated with the resource request. Such properties can include, without limitation, an identification of the email message) which might be based, for example, on an identifier in the URL (and/or the corresponding HTTP GET request received from the email client), a recipient of the email message (which again may be derived from such an identifier), an IP address of the recipient computer on which the message was opened or displayed, and/or a physical location (or approximate physical location) of the recipient computer (which can be derived from the IP address in many cases, obtained from GPS data from the recipient computer, etc.) on which the email message was opened or displayed.

In some embodiments, the characteristics or properties can include a timestamp of the request (which can indicate the time at which an email message, from which the request was generated, was opened or loaded for display). (As used herein, the term "timestamp" means any value, either relative or absolute, that can provide a chronological reference for an email message, resource request, and/or the like.) In some cases, the timestamp might be included in the resource request itself, while in others, the resource server might calculate the timestamp upon receiving the request. In some cases, the request properties can include information about a device type of the recipient computer that opened or displayed the email message. For example, in some case, the recipient computer might be a mobile device, such as a smart phone, while in other cases, the recipient computer might be a personal computer, such as a desktop or laptop. One technique for identifying the mobile device is by analyzing the user agent string provided with the HTTP GET request.

The method 300 can include recording an indication that the recipient opened the email message (block 310). This information can be useful for assembling metrics on consumer response to promotional campaigns, for example.

Recording an indication that the recipient opened the email message might comprise updating a record in the database associate with the email message. This indication might include a timestamp of the request and/or the email message.

At block 315, the timestamp is analyzed. In one aspect, the timestamp can be compared with an earlier timestamp associated with a request for the same resource (i.e., an earlier request generated by the same email message). For instance, if the recipient opens the same email message twice, it may be desirable for the resource server to provide two different sets of content (e.g., to provide fresh content each time the email message is opened). However, it may be inefficient to generate new content each time the email message is opened. Accordingly, in some embodiments, the properties of a particular resource request can be examined to determine whether it was received from the same recipient computer as an earlier request, and if so, the respective timestamps of the two requests can be compared. If it is determined that the later (additional) request falls within a specified window of time after an earlier request, a cache version of the content generated for the earlier request can be transmitted as a response to the later request (block 325). If the later request falls outside of this window, new content can be generated to respond to the later request, as described below. The duration of this window of time is discretionary and may depend upon the implementation.

In some cases the content to be returned to the recipient computer can be customized for the recipient. Accordingly at block 330, the method 300 comprises identifying a set of demographic information about the recipient. One or more properties of the request itself (such as a message identifier, IP address, etc.) can be used to help identify demographic information about the recipient. Merely by way of example, a database of demographic information about recipients may be maintained, compiled, purchased from a third party, etc., and may be searched (using the recipient's identity as a key, for example) to obtain demographic information about the recipient. Demographic information can include, without limitation, the recipient's address, age, education level, gender, marital status, interests, purchasing habits, and/or hobbies, income level, browsing habits and/or past online behavior, to name but a few examples.

At 330, the method 300 comprises obtaining a set of content to be provided in response to the resource request. In an aspect, the nature of this content can be based on one or more properties of the request itself and/or some or all of the demographic information about the recipient. Merely by way of example, in some cases, the content may be time-sensitive, such that the timestamp of the request is taken into account when obtaining the content. It in other cases, the physical location of the recipient at the time the message is opened may be taken into account when obtaining the content. In further embodiments, some or all of the recipient's demographic information can be used to determine what type of content should be provided in response to the request. Merely by way of example if the email message is a promotional email message, the recipient's interests can be used to identify promotions that are likely to be interesting to the recipient, and the content generated for that recipient can be based on these promotions.

There are a variety of ways in which a resource server can obtain content. In some cases, for example, the resource server may have content stored locally, in which case the resource server can filter the available content using request properties and/or demographic information as filter criteria. Alternatively and/or additionally, some systems may implement a content server to provide and/or determine content that should be returned by the resource server.

FIG. 4 illustrates a method 400 for obtaining content from a content server. The method 400 comprises transmitting (e.g., from the resource server) a content request, which, in an aspect, may comprise some or all of the characteristics or properties of the resource request (including without limitation some or all of the characteristics about the circumstances under which the email message was opened or displayed), and/or some or all of the demographic information of the recipient. At block 410, the content server receives the content request, and at block 415, the content server generates a content definition responsive to the content request. The content server can use any of a variety of techniques to generate content definition; in some cases, the content server is equipped with an application to analyze the provided request properties and/or demographic information to identify appropriate content for the request. The content definition can be formatted in any of a variety of ways; merely by way of example, in some embodiments the content definition comprises XML code. In some cases, the content server, rather than providing a content definition may provide the content itself, in the form of images, text, video, and/or the like.

At block 420, the content server transmits the content definition (and/or, as appropriate, the content itself) to be received by the resource server. Upon receiving the content definition, the resource server generates the content (block 430) specified by the content definition. In one aspect, generating the content comprises generating customized text, obtaining (e.g., from a data store) pre-created text, video, images, and/or the like.

In some cases, email clients are not configured to display downloaded content other than images. Accordingly, returning to FIG. 3, the method 300 may include generating a set of one or more images from the obtained content (block 335), to be provided as a response to the resource request from the recipient computer. This technique can ensure that the content can be displayed by the email client at the recipient computer. Such images can replicate the content so that, for example, the image may appear to the recipient to contain one or more text blocks, even though it is an image.

In some embodiments, the method 300 comprises identifying a URL associated with a set of content that has been obtained. For example, if the resource server has obtained content relating to particular promotion sponsored by third-party this URL might reference a website maintained by the third-party. As another example, if the content relates to a news story, the URL might reference a website with further information about the story. In an aspect, the URL may be provided by a content server as part of a content definition.

At block 345, the method 300 comprises correlating the URL that is associated with the generated content with a URL that is provided in the email message (e.g., the URL contained in an anchor tag associated with the image tag in the message). This correlation can include, for example, updating an entry in the database to cross-reference the two URLs. This, for example, can allow the resource server (or another computer) to redirect a request for the URL in the anchor tag to an appropriate website associated with the content to be provided to the recipient computer, as described further below. At block 350, the method 300 comprises transmitting the generated image(s) (and/or other content) to be received by the recipient computer. These images (and/or other content) thus represent the resource requested by the resource request from the recipient computer.

Returning to FIG. 2, once the recipient computer receives the image(s) and/or other content from the resource server, the recipient computer displays the image(s) (block 235). In an aspect, the email client on the recipient computer might display the image(s) in the body of the email message (e.g., at the position in the message specified by the image tag).

At block 240, the recipient computer receives a selection of the URL provided in the anchor tag of the message (which, in many cases, will be associated with the displayed image). As noted above, this selection might be effected by the user clicking on the image. Based on that selection of the URL, the recipient computer system will transmit a second resource request for a second resource specified by the selected URL (block 245). This URL might reference the resource server, or it might reference another computer (such as a different web server, etc.)

Upon receiving this second resource request (block 250), the resource server (or the other web server) might record an indication that the recipient selected the URL (block 245), e.g., in the same manner in which the system records an indication that the email message was received, as described above. The system might then determine that the request should be directed to a different URL associated with the content that was provided to the recipient client for display in the email message. As noted above, the system might correlate the URL provided in the anchor tag with another URL that is associated with the generated content, and the system therefore might redirect the second content request to this correlated URL (block 260), which might reference a web site (or other content) that is related to the images (or other content) displayed in the email message. For example, if the displayed images (or other content) comprise a promotional offer from a particular entity, the correlated URL might reference a web site associated with that entity.

Upon redirection, the recipient computer will download the referenced content and can display that content for the user (block 265). In an exemplary case, this new content might be a web page, and it might be displayed in a web browser, or other appropriate application.

Figure 5:
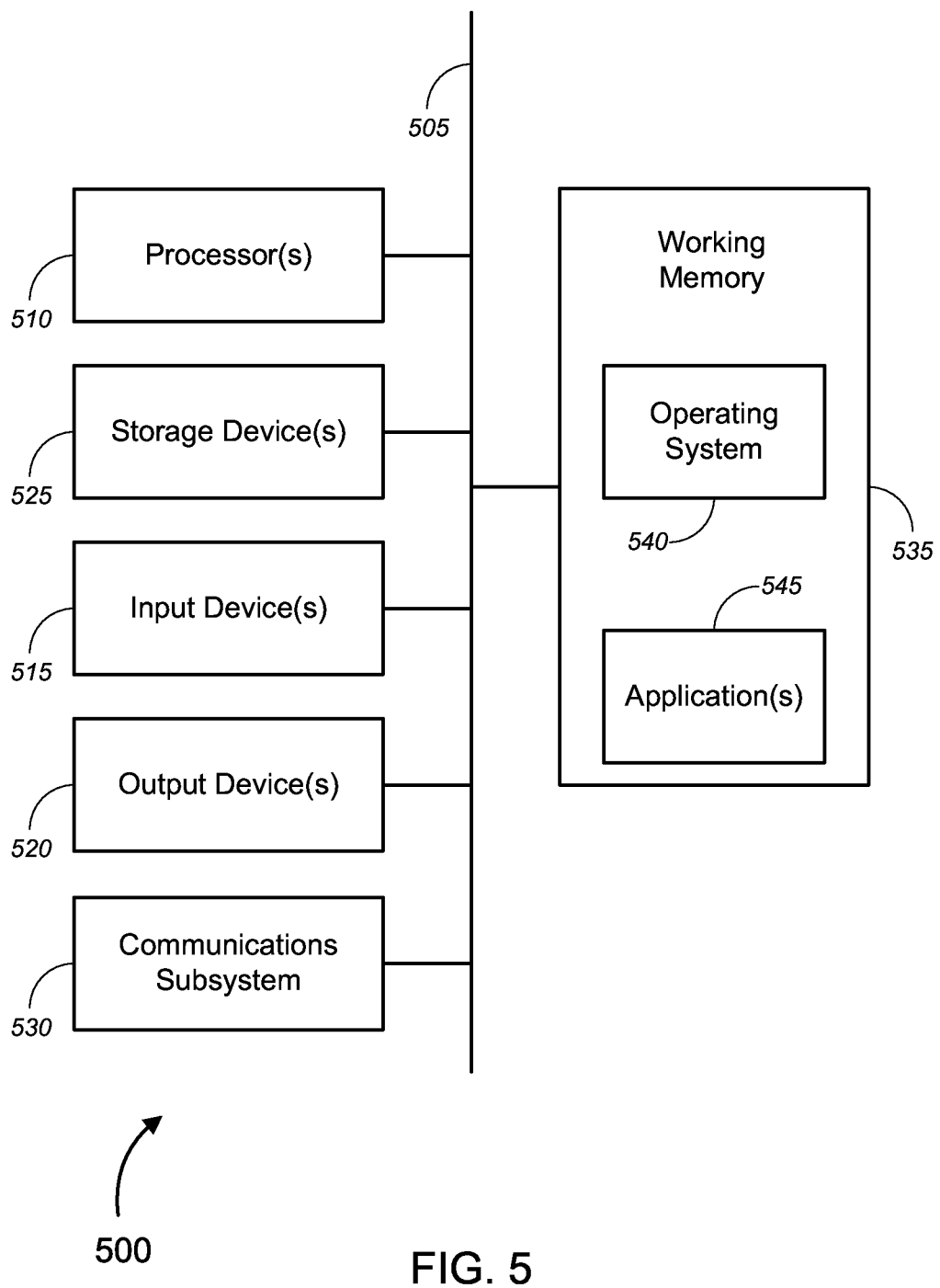
FIG. 5 is a generalized schematic diagram illustrating a computer system, in accordance with various embodiments.

FIG. 5 provides a schematic illustration of one embodiment of a computer system 500 that can perform the methods provided by various other embodiments, as described herein, and/or can function as a mail server, resource server, content server, web server, and/or recipient computer, as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include one or more processors 510, including without limitation one or more general-purpose processors and/or one or more special-purpose processors (such as digital signal processing chips, graphics acceleration processors, and/or the like); one or more input devices 515, which can include without limitation a mouse, a keyboard and/or the like; and one or more output devices 520, which can include without limitation a display device, a printer and/or the like.

The computer system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communications subsystem 530, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer systems, and/or with any other devices described herein. In many embodiments, the computer system 500 will further comprise a working memory 535, which can include a RAM or ROM device, as described above.

The computer system 500 also may comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 500) to perform methods in accordance with various embodiments of the invention. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium", as used herein, refer to any medium that participates in providing data that causes a machine to operate in a specific fashion. In an embodiment implemented using the computer system 500, various computer readable media might be involved in providing instructions/code to processor(s) 510 for execution and/or might be used to store and/or carry such instructions/code (e.g., as signals). In many implementations, a computer readable medium is a non-transitory, physical and/or tangible storage medium. Such a medium may take many forms, including but not limited to, non-volatile media, volatile media, and transmission media. Non-volatile media includes, for example, optical and/or magnetic disks, such as the storage device(s) 525. Volatile media includes, without limitation, dynamic memory, such as the working memory 535. Transmission media includes, without limitation, coaxial cables, copper wire and fiber optics, including the wires that comprise the bus 505, as well as the various components of the communication subsystem 530 (and/or the media by which the communications subsystem 530 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500. These signals, which might be in the form of electromagnetic signals, acoustic signals, optical signals and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
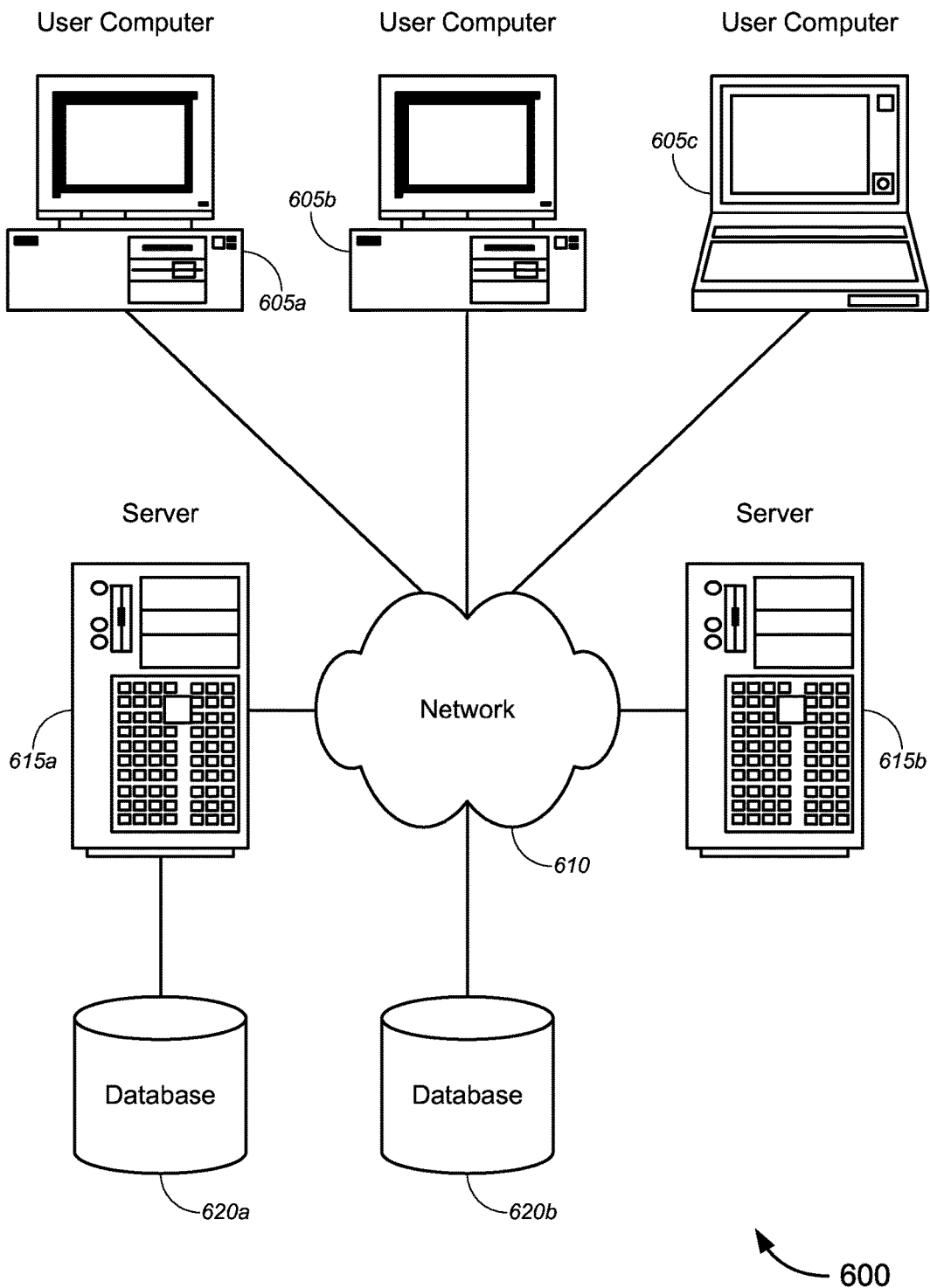
FIG. 6 is a block diagram illustrating a networked system of computers, which can be used in accordance with various embodiments.

As noted above, a set of embodiments comprises systems for providing dynamic email messages. FIG. 6 illustrates a schematic diagram of a system 600 that can be used in accordance with one set of embodiments. The system 600 can include one or more user computers 605. A user computer 605 can be a general purpose personal computer (including, merely by way of example, desktop computers, laptop computers, handheld computers, and the like, running any appropriate operating system, several of which are available from vendors such as Apple, Microsoft Corp., and the like) and/or a workstation computer running any of a variety of commercially-available UNIX™ or UNIX-like operating systems. A user computer 605 can also have any of a variety of applications, including one or more applications configured to perform methods provided by various embodiments (as described above, for example), as well as one or more office applications, database client and/or server applications, and/or web browser applications. Alternatively, a user computer 605 can be any other electronic device, such as a thin-client computer, Internet-enabled mobile telephone, and/or personal digital assistant, capable of communicating via a network (e.g., the network 610 described below) and/or of displaying and navigating web pages or other types of electronic documents. Although the exemplary system 600 is shown with three user computers 605, any number of user computers can be supported.

Certain embodiments operate in a networked environment, which can include a network 610. The network 610 can be any type of network familiar to those skilled in the art that can support data communications using any of a variety of commercially-available (and/or free or proprietary) protocols, including without limitation TCP/IP, SNA™, IPX™, AppleTalk™, and the like. Merely by way of example, the network 610 can include a local area network ("LAN"), including without limitation a fiber network, an Ethernet network, a Token-Ring™ network and/or the like; a wide-area network; a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments can also include one or more server computers 615. Each of the server computers 615 may be configured with an operating system, including without limitation any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 may be a web server, which can be used, merely by way of example, to process requests for web pages or other electronic documents from user computers 605. In an aspect, therefore, the web server can serve as a resource server, as described above. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle™, Microsoft™, Sybase™, IBM™ and the like, which can process requests from clients (including, depending on the configuration, dedicated database clients, API clients, web browsers, etc.) running on a user computer 605 and/or another server 615. In some embodiments, an application server can create dynamic content, e.g., for display in an email message, web browser, etc. Hence, in some embodiments, the application server can serve as a content server. Data provided by an application server may be formatted as one or more web pages or other documents (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620. The location of the database(s) 620 is discretionary: merely by way of example, a database 620a might reside on a storage medium local to (and/or resident in) a server 615a (and/or a user computer 605). Alternatively, a database 620b can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 635 can be a relational database, such as an Oracle database, that is adapted to store, update, and retrieve data in response to SQL-formatted commands. The database might be controlled and/or maintained by a database server, as described above, for example.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with, or without, certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method of providing a dynamic electronic mail message, the method comprising:
   transmitting an electronic message from a mail server computer system, the electronic message comprising:
   a hypertext markup language ("HTML") image ("IMG") tag comprising a first uniform resource locator ("URL") that references a first resource at a resource server computer system;
   an HTML anchor ("A") tag comprising a second URL; and
   a dynamic subject field;
   receiving the electronic message at an electronic mail client on a recipient computer system, wherein the electronic mail client does not support dynamic content;
   loading the electronic message for display at the recipient computer system, wherein loading the electronic message for display comprises transmitting a request for a first resource referenced by the first URL;

receiving, at the resource server computer system, the request for the first resource referenced by the first URL;

executing a first executable script at the resource server computer system, based on the request for the first resource, wherein executing the first executable script comprises:

recording an indication that the recipient opened the electronic message;

identifying a set of characteristics about the circumstances under which the electronic message was loaded for display, the set of characteristics comprising:

an identification of the electronic message, based at least in part on the request for the first resource;

a recipient of the electronic message, based at least in part on the request for the first resource;

an Internet Protocol ("IP") address of the recipient computer system that loaded the electronic message for display, based at least in part on the request for the first resource;

a device type of the recipient computer system that loaded the electronic message for display, based at least in part on the request for the first resource;

a physical location of the recipient computer system that loaded the electronic message for display, based at least in part on the IP address of the recipient computer system; and a timestamp indicating a time at which the electronic message was loaded for display;

identifying a set of demographic information about the recipient, based at least in part on one or more characteristics about the circumstances under which the message was loaded for display, the set of demographic information comprising one or more values from the group consisting of:

an address of the recipient;

an age of the recipient;

an education level of the recipient;

a gender of the recipient;

a marital status of the recipient;

a set of one or more interests of the recipient;

an income level of the recipient; and past online behavior of the recipient;

obtaining a first set of content to be provided in response to the first request, based at least in part on one or more characteristics about the circumstances under which the electronic message was loaded for display and at least a portion of the set of demographic information about the recipient;

generating a set of one or more images comprising the first set of content to be provided in response to the first request; and transmitting the set of one or more images as the first resource, for reception by the recipient computer system, in response to the first request;

receiving, at the recipient computer system, the set of one or more images;

displaying, at the recipient computer system, the set of one or more images within the body of the electronic message;

displaying, at the recipient computer system, at least a portion of the set of one or more images obtained by the resource server in the dynamic subject field of the electronic message;

receiving, at the recipient computer system, a selection by a user of the second URL;

transmitting, from the recipient computer system, a request for a second resource referenced by the second URL;

receiving, at a web server computer system, the request for the second resource referenced by the second URL;

executing a second executable script at the web server computer system, based on the request for the second resource, wherein executing the second executable script comprises:

recording an indication that the recipient selected the second URL;

determining whether the request for the second resource referenced by the second URL should be directed to a different URL that is separate from the second URL;

based on a determination that the request should be directed to the different URL, correlating the second URL with a third URL that is associated with the second resource, the third URL being different from the second URL, and redirecting the request for the second resource referenced by the second URL to a third set of content referenced by the third URL; and displaying the third set of content in a web browser at the recipient computer system.

2. The method of claim 1, wherein executing the first executable script further comprises:

caching, at a data store accessible by the resource server computer system, the generated set of one or more images.

3. The method of claim 2, further comprising:

receiving, at the resource server computer system, an additional request for the first resource;

determining, at the resource server computer system that the additional request was received from the recipient computer; and analyzing a timestamp of the additional request.

4. The method of claim 3, further comprising:

transmitting the cached set of images in response to the additional request, based on a determination that the additional request falls within a specified window of time after the first request.

5. The method of claim 3, further comprising:

generating a new set of images, based on a determination that the additional request falls outside a specified window of time after the first request; and transmitting the new set of images in response to the additional request.

6. The method of claim 1, wherein the mail server computer system and the resource server computer system are the same computer system.

7. The method of claim 1, wherein the resource server computer system and the web server computer system are the same computer system.

8. The method of claim 1, wherein the first set of content comprises a promotional offer from an entity, and wherein the third URL references a web site associated with the entity.

9. The method of claim 1, wherein identifying a set of demographic information about the recipient comprises requesting the set of demographic information from a database, based on an identity of the recipient.

10. The method of claim 1, wherein obtaining a first set of content comprises:

transmitting, from the resource server computer system, a content request, the content request comprising one or more of at least a portion of the set of demographic information or at least one of the properties of the first request;

receiving, at a content server, the request for content;

generating, at the content server, a content definition;

transmitting, from the content server, the content definition;

receiving, at the resource server computer system, the content definition; and generating the content at the resource server computer system, based at least in part on the content definition.

11. The method of claim 10, wherein the content definition is formatted with eXtensible Markup Language ("XML").

12. The method of claim 10, wherein the one or more properties of the content request comprises the device type of the recipient computer, at least a portion of the timestamp, and the physical location of the recipient computer.

13. A system, comprising:
a mail server comprising a first processor and a first computer readable medium having encoded thereon a first set of instructions executable by the first processor to cause the mail server to perform one or more operations, the first set of instructions comprising:
instructions for transmitting an electronic message, the electronic message comprising:
a hypertext markup language ("HTML") image ("IMG") tag comprising a first uniform resource locator ("URL") that references a first resource at a resource server computer system;
an HTML anchor ("A") tag comprising a second URL; and
a dynamic subject field;
a recipient computer system comprising a second processor and a second computer readable medium having encoded thereon a second set of instructions executable by the second processor to cause the recipient computer to perform one or more operations, the second set of instructions comprising:
instructions for receiving the electronic message with an electronic mail client that does not support dynamic content; and
instructions for loading the electronic message for display with the electronic mail client, wherein loading the electronic message for display comprises transmitting a request for a first resource referenced by the first URL;
a resource server comprising a third processor and a third computer readable medium having encoded thereon a third set of instructions executable by the third processor to cause the resource server to perform one or more operations, the third set of instructions comprising:
instructions for receiving, at the resource server computer system, the request for the first resource referenced by the first URL;
instructions for executing a first executable script at the resource server computer system, based on the request for the first resource, wherein the first executable script comprises:
instructions for recording an indication that the recipient opened the electronic message;
instructions for identifying a set of characteristics about the circumstances under which the electronic message was loaded for display, the set of characteristics comprising:
an identification of the electronic message, based at least in part on the request for the first resource;
a recipient of the electronic message, based at least in part on the request for the first resource;
an Internet Protocol ("IP") address of the recipient computer system that loaded the electronic message for display, based at least in part on the request for the first resource;
a device type of the recipient computer system that loaded the electronic message for display, based at least in part on the request for the first resource;
a physical location of the recipient computer system that loaded the electronic message for display, based at least in part on the IP address of the recipient computer system; and
a timestamp indicating a time at which the electronic message was loaded for display;
instructions for identifying a set of demographic information about the recipient, based at least in part on one or more characteristics about the circumstances under which the electronic message was loaded for display, the set of demographic information comprising one or more values from the group consisting of:
an address of the recipient;
an age of the recipient;
an education level of the recipient;
a gender of the recipient;
a marital status of the recipient;
a set of one or more interests of the recipient;
an income level of the recipient; and
past online behavior of the recipient;
instructions for obtaining a first set of content to be provided in response to the first request, based at least in part on one or more characteristics about the circumstances under which the electronic message was loaded for display and at least a portion of the set of demographic information about the recipient;
instructions for generating a set of one or more images comprising the first set of content to be provided in response to the first request; and
instructions for transmitting the set of one or more images as the first resource, for reception by the recipient computer system, in response to the first request;
wherein the second set of instructions at the recipient computer system further comprises:
instructions for receiving the set of one or more images;
instructions for displaying the set of one or more images within the body of the electronic message;
instructions for displaying at least a portion of the set of one or more images obtained by the resource server in the dynamic subject field of the electronic message;
instructions for receiving a selection by the user of the second URL; and
instructions for transmitting a request for a second resource referenced by the second URL;
wherein the system further comprises a web server comprising a fourth processor and a fourth computer readable medium having encoded thereon a fourth set of instructions executable by the fourth processor to cause the web server to perform one or more operations, the fourth set of instructions comprising:

instructions for receiving the request for the second resource referenced by the second URL; and
instructions for executing a second executable script, based on the request for the second resource, wherein the second executable script comprises:
  instructions for recording an indication that the recipient selected the second URL;
  determining whether the request for the second resource referenced by the second URL should be directed to a different URL that is separate from the second URL;
  based on a determination that the request should be directed to the different URL, correlating the second URL with a third URL that is associated with the second resource, the third URL being different from the second URL, and redirecting the request for the second resource referenced by the second URL to a third set of content referenced by the third URL; and
wherein the second set of instructions at the recipient computer system further comprises:
  instructions for displaying the third set of content in a web browser.

14. The system of claim 13, wherein the mail server and the resource server are the same computer, wherein the first processor and the third processor are the same processor, and wherein the first computer readable medium and the third computer readable medium are the same computer readable medium.

15. The system of claim 13, wherein the resource server and the web server are the same computer, wherein the third processor and the fourth processor are the same processor, and wherein the third computer readable medium and the fourth computer readable medium are the same computer readable medium.

16. A method of providing a dynamic electronic mail message, the method comprising:
  transmitting an electronic message, the electronic message comprising:
    a markup language tag comprising a first uniform resource locator ("URL"), wherein the markup language tag is configured to request a first resource when the electronic message is displayed at a recipient computer system;
  receiving, at a server computer system, a request from an electronic mail client on the recipient computer system for the first resource referenced by the first URL, wherein the electronic mail client does not support dynamic content;
  identifying, at the server computer system, a set of characteristics about the circumstances under which the electronic message was displayed at the recipient computer system;
  determining, at the server computer system, whether the request should be directed to a different URL that is separate from the first URL;
  based on a determination that the request should be directed to the different URL, correlating, at the server computer system, the first URL with a second URL that is associated with the first resource, the second URL being different from the first URL, and redirecting the first request to the second URL;
  generating, at the server computer system, a set of content to be provided in response to the first request, based at least in part on one or more of the characteristics about the circumstances under which the electronic message was displayed at the recipient computer system; and
  transmitting, from the server computer system, the set of content to be displayed within the body of the electronic message at the recipient computer system, wherein at least a portion of the set of content obtained by the resource server is displayed in a dynamic subject field of the electronic message.

17. The method of claim 16, wherein the set of content comprises one or more images.

18. The method of claim 17, wherein the one or more images comprise one or more text blocks.

19. The method of claim 16, wherein the set of content comprises video.

20. The method of claim 16, wherein the set of content comprises text.

21. The method of claim 16, wherein the markup language is HTML5.

22. The method of claim 16, wherein at least a portion of the set of content is a hyperlink.

23. A computer system, comprising:
  one or more processors;
  a mail server;
  a resource server;
  a first set of instructions executable by at least one of the one or more processors to cause the mail server to perform one or more operations, the first set of instructions comprising:
    instructions for transmitting an electronic message, the message comprising:
      a markup language tag comprising a first uniform resource locator ("URL"), wherein the markup language tag is configured to request a first resource when the electronic message is displayed at a recipient computer system; and
  a second set of instructions executable by at least one of the one or more processors to cause the resource server to perform one or more operations, the second set of instructions comprising:
    instructions for identifying, upon receipt of a request from an electronic mail client on the recipient computer system for the first resource referenced by the first URL, a set of characteristics about the circumstances under which the electronic message was displayed at the recipient computer system, wherein the electronic mail client does not support dynamic content;
    instructions for determining whether the request should be directed to a different URL that is separate from the first URL;
    instructions for, based on a determination that the request should be directed to the different URL, correlating the first URL with a second URL that is associated with the first resource, the second URL being different from the first URL, and redirecting the first request to the second URL;
    instructions for generating a set of content to be provided in response to the first request, based at least in part on one or more of the characteristics about the circumstances under which the electronic message was displayed at the recipient computer system; and
    instructions for transmitting, from the server computer system, the set of content to be displayed within the body of the electronic message at the recipient computer system, wherein at least a portion of the set of content obtained by the resource server is displayed in a dynamic subject field of the electronic message.

24. An apparatus, comprising:
a non-transitory computer readable medium having stored thereon a set of instructions executable by one or more computers to perform one or more operations, the set of instructions comprising:
instructions for transmitting an electronic message, the message comprising:
a markup language tag comprising a first uniform resource locator ("URL"), wherein the markup language tag is configured to request a first resource when the electronic message is displayed at a recipient computer system; and
instructions for identifying, upon receipt of a request from an electronic mail client on the recipient computer system for the first resource referenced by the first URL, a set of characteristics about the circumstances under which the electronic message was displayed at the recipient computer system, wherein the electronic mail client does not support dynamic content;
instructions for determining whether the request should be directed to a different URL that is separate from the first URL;
instructions for, based on a determination that the request should be directed to the different URL, correlating the first URL with a second URL that is associated with the first resource, the second URL being different from the first URL, and redirecting the first request to the second URL;
instructions for generating a set of content to be provided in response to the first request, based at least in part on one or more of the characteristics about the circumstances under which the electronic message was displayed at the recipient computer system; and
instructions for transmitting, from the server computer system, the set of content to be displayed within the body of the electronic message at the recipient computer system, wherein at least a portion of the set of content obtained by the resource server is displayed in a dynamic subject field of the electronic message.

25. A method of providing content for an electronic mail message, the electronic mail message comprising a markup language tag comprising a first uniform resource locator ("URL"), the method comprising:
receiving, at a server computer system, a request from an electronic mail client on a recipient computer system for a first resource referenced by the first URL, wherein the electronic mail client does not support dynamic content;
identifying, at the server computer system, a set of characteristics about the circumstances under which the electronic mail message was displayed at the recipient computer system;
determining, at the server computer system, whether the request should be directed to a different URL that is separate from the first URL;
based on a determination that the request should be directed to the different URL, correlating, at the server computer system, the first URL with a second URL that is associated with the first resource, the second URL being different from the first URL, and redirecting the first request to the second URL;
generating, at the server computer system, a set of content to be provided in response to the first request, based at least in part on one or more of the characteristics about the circumstances under which the electronic message was displayed at the recipient computer system; and
transmitting, from the server computer system, the set of content to be displayed within the body of the electronic message at the recipient computer system, wherein at least a portion of the set of content obtained by the resource server is displayed in a dynamic subject field of the electronic message.

26. A computer system for providing content for an electronic mail message, the electronic mail message comprising a markup language tag comprising a first uniform resource locator ("URL"), the computer system comprising:
a processor; and
a computer readable medium in communication with the processor, the computer readable medium having encoded thereon a set of instructions executable by the processor to cause the computer system to perform one or more operations, the set of instructions comprising:
instructions for identifying, upon receipt of a request from an email client on a recipient computer system for a first resource referenced by the first URL, a set of characteristics about the circumstances under which the electronic mail message was displayed at the recipient computer system, wherein the electronic mail client does not support dynamic content;
instructions for determining whether the request should be directed to a different URL that is separate from the first URL;
instructions for, based on a determination that the request should be directed to the different URL, correlating the first URL with a second URL that is associated with the first resource, the second URL being different from the first URL, and redirecting the first request to the second URL;
instructions for generating a set of content to be provided in response to the first request, based at least in part on one or more of the characteristics about the circumstances under which the electronic mail message was displayed at the recipient computer system; and
instructions for transmitting the set of content to be displayed within the body of the electronic message at the recipient computer system, wherein at least a portion of the set of content obtained by the resource server is displayed in a dynamic subject field of the electronic message.

27. An apparatus for providing content for an electronic mail message, the electronic mail message comprising a markup language tag comprising a first uniform resource locator ("URL"), the apparatus comprising:
a non-transitory computer readable medium having stored thereon a set of instructions executable by one or more computers to perform one or more operations, the set of instructions comprising:
instructions for identifying, upon receipt of a request from an electronic mail client on a recipient computer system for a first resource referenced by the first URL, a set of characteristics about the circumstances under which the electronic mail message was displayed at the recipient computer system, wherein the electronic mail client does not support dynamic content;
instructions for determining whether the request should be directed to a different URL that is separate from the first URL;

instructions for, based on a determination that the request should be directed to the different URL, correlating the first URL with a second URL that is associated with the first resource, the second URL being different from the first URL, and redirecting the first request to the second URL;

instructions for generating a set of content to be provided in response to the first request, based at least in part on one or more of the characteristics about the circumstances under which the electronic mail message was displayed at the recipient computer system; and instructions for transmitting the set of content to be displayed within the body of the electronic message at the recipient computer system, wherein at least a portion of the set of content obtained by the resource server is displayed in a dynamic subject field of the electronic message.

\* \* \* \* \*